United States Patent
Kuehnel et al.

(10) Patent No.: US 11,988,511 B2
(45) Date of Patent: May 21, 2024

(54) MICROMECHANICAL COMPONENT FOR A ROTATION RATE SENSOR AND CORRESPONDING MANUFACTURING METHOD

(71) Applicant: Robert Bosch GmbH, Stuttgart (DE)

(72) Inventors: Matthias Kuehnel, Boeblingen (DE); Nils Felix Kuhlmann, Ehningen (DE); Robert Maul, Reutlingen (DE); Rolf Scheben, Reutlingen (DE); Steffen Markisch, Reutlingen (DE); Thorsten Balslink, Kirchentellinsfurt (DE); Wolfram Geiger, Gomaringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 64 days.

(21) Appl. No.: 17/908,081

(22) PCT Filed: Apr. 14, 2021

(86) PCT No.: PCT/EP2021/059639
§ 371 (c)(1),
(2) Date: Aug. 30, 2022

(87) PCT Pub. No.: WO2021/219374
PCT Pub. Date: Nov. 4, 2021

(65) Prior Publication Data
US 2023/0095336 A1    Mar. 30, 2023

(30) Foreign Application Priority Data
Apr. 28, 2020 (DE) ............. 10 2020 205 369.3

(51) Int. Cl.
*G01C 19/5712* (2012.01)
*G01C 19/5684* (2012.01)
*G01C 25/00* (2006.01)

(52) U.S. Cl.
CPC ..... *G01C 19/5712* (2013.01); *G01C 19/5684* (2013.01); *G01C 25/00* (2013.01)

(58) Field of Classification Search
CPC . G01C 19/5712; G01C 19/5684; G01C 25/00
See application file for complete search history.

(56) References Cited

U.S. PATENT DOCUMENTS 9,759,563 B2 * 9/2017 Loreck ............... G01C 19/5733
2006/0112764 A1 * 6/2006 Higuchi ............ G01C 19/5712
73/504.12

(Continued)

FOREIGN PATENT DOCUMENTS

DE   102017216010 A1   3/2019
WO   2019010246 A1   1/2019

OTHER PUBLICATIONS

International Search Report for PCT/EP2021/059639, dated Jul. 1, 2021.

*Primary Examiner* — David J Bolduc
(74) *Attorney, Agent, or Firm* — NORTON ROSE FULBRIGHT US LLP; Gerard A. Messina (57) ABSTRACT

A micromechanical component for a rotation rate sensor. The micromechanical component includes two rotor masses, mirror symmetrical with respect to a first plane of symmetry aligned perpendicularly to a substrate surface and passing through the center of the two rotor masses, which may be set in rotational vibrating motion about rotational axes aligned perpendicularly to the substrate surface, and four seismic masses, mirror symmetrical with respect to the first plane of symmetry, deflectable in parallel to the first plane of symmetry using the two rotor masses set in their respective rotational vibrating motion. The first rotor mass and a first pair of the four seismic masses connected thereto are mirror symmetrical to the second rotor mass and to a second pair of the four seismic masses connected thereto with respect to a (Continued)

second plane of symmetry aligned perpendicularly to the substrate surface and to the first plane of symmetry.

10 Claims, 6 Drawing Sheets

(56) References Cited

U.S. PATENT DOCUMENTS

| | | | | |
|---|---|---|---|---|
| 2007/0214883 A1* | 9/2007 | Durante | G01P 15/125 | 73/504.04 |
| 2010/0126269 A1* | 5/2010 | Coronato | G01C 19/56 | 73/504.04 |
| 2010/0126272 A1* | 5/2010 | Coronato | G01C 19/5712 | 29/829 |
| 2010/0281977 A1* | 11/2010 | Coronato | G01C 19/5747 | 29/592.1 |
| 2011/0023600 A1* | 2/2011 | Wrede | G01C 19/5712 | 73/504.13 |
| 2011/0296913 A1* | 12/2011 | Ohms | G01C 19/5755 | 73/504.12 |
| 2013/0298672 A1* | 11/2013 | Kuhlmann | G01C 19/5747 | 73/504.12 |
| 2014/0021564 A1* | 1/2014 | Cazzaniga | G01C 19/5712 | 257/415 |
| 2014/0060184 A1* | 3/2014 | Walther | G01P 15/123 | 73/504.03 |
| 2014/0260610 A1* | 9/2014 | McNeil | G01C 19/5712 | 73/504.12 |
| 2014/0373628 A1* | 12/2014 | Balslink | G01C 19/5712 | 73/504.12 |
| 2015/0068308 A1* | 3/2015 | Blomqvist | B81B 7/0058 | 73/504.12 |
| 2015/0377624 A1* | 12/2015 | Falorni | B81B 3/0018 | 73/504.12 |
| 2018/0038692 A1* | 2/2018 | Prati | G01C 19/574 | |
| 2018/0231381 A1* | 8/2018 | Lassl | G01C 19/5747 | |
| 2019/0072389 A1* | 3/2019 | Prati | G06F 12/0817 | |
| 2019/0078887 A1* | 3/2019 | Bode | G01C 19/5747 | |
| 2020/0263990 A1* | 8/2020 | Kuisma | G01C 19/5712 | |
| 2021/0333103 A1* | 10/2021 | Kuehnel | G01C 25/00 | |

* cited by examiner

MICROMECHANICAL COMPONENT FOR A ROTATION RATE SENSOR AND CORRESPONDING MANUFACTURING METHOD

CROSS REFERENCE

The present invention relates to a micromechanical component for a rotation rate sensor and to a rotation rate sensor. The present invention also relates to a manufacturing method for a micromechanical component for a rotation rate sensor.

BACKGROUND INFORMATION

A micromechanical rotation rate sensor is described in German Patent Application No. DE 10 2017 216 010 A1 that includes two rotor masses, which may be set in rotational vibrating motions with the aid of a drive frame device. Four seismic masses may also be set into harmonic vibrating motions with the aid of the drive frame device. The two rotor masses and the four seismic masses are mirror symmetrical with respect to a plane of symmetry passing through the center of the rotor masses.

SUMMARY

The present invention provides a micromechanical component for a rotation rate sensor, a rotation rate sensor, and a manufacturing method for a micromechanical component for a rotation rate sensor.

The present invention provides micromechanical components, which may be advantageously used in each case as at least part of a rotational rate sensor, in particular, of a 3-axis rotational rate sensor. According to an example embodiment of the present invention, due to the mirror symmetrical design/arrangement of the two rotor masses and of the four seismic masses of a micromechanical component according to the present invention, both with respect to a first plane of symmetry passing through the center of the two rotor masses and with respect to a second plane of symmetry aligned perpendicular to the first plane of symmetry, the data rate sensor implemented with the aid of the respective micromechanical component is relatively insensitive to external linear and rotational accelerations. A sensor design of the respective micromechanical component according to the present invention is, in particular, comparatively "rigid" for a mode/interference mode excited by an external linear and rotational acceleration of the micromechanical components, so that the two rotor masses and the four seismic masses of the respective micromechanical component carry out at most minor movements in response to the external linear and rotational acceleration. This helps to improve a measuring accuracy of the rotation rate sensor implemented with the respective micromechanical component according to the present invention and to prevent erroneous measurements of the respective rotation rate sensor.

One further advantage of the micromechanical components of the present invention according to example embodiments is their comparatively low vibrational sensitivity, even at higher frequencies. Nevertheless, the sensor design of the micromechanical component requires only relatively little installation space, so that the present invention may also be utilized for miniaturizing rotation rate sensors. Due to the comparatively low vibrational sensitivity of the respective micromechanical component according to the present invention and to its relatively minimal installation space requirement, the present invention also contributes to the rotation rate sensors implemented thereby being capable of being used with greater versatility.

In one advantageous specific example embodiment of the micromechanical component of the present invention, the two rotor masses and the four seismic masses are designed and/or situated in such a way that a shared center of mass of the stationary first rotor mass, of the stationary second rotor mass, of the stationary first pair of seismic masses and of the stationary second pair of seismic masses is situated in a line of intersection of the first plane of symmetry with the second plane of symmetry. This improves a robustness of the micromechanical component against an occurrence of interference modes excited by external linear and rotational accelerations.

The two rotor masses and the four seismic masses are preferably designed and/or situated in such a way that even when the two rotor masses are set in their respective rotational vibrating motion in such a way that the four seismic masses are deflectable in each case in parallel to the first plane of symmetry, the shared center of mass of the first rotor mass, of the second rotor mass, of the first pair of seismic masses and of the second pair of seismic masses is situated in the line of intersection of the first plane of symmetry with the second plane of symmetry. A conventional position feedback control may thus be easily eliminated in the specific embodiment of the micromechanical component described herein. This also enables an elimination of a coupling of the two rotor masses and of the four seismic masses.

According to an example embodiment of the present invention, the two rotor masses are preferably designed and/or situated in such a way that when the two rotor masses are set in their respective rotational vibrating motion, a vector sum of a first torque of the first rotational vibrating motion of the first rotor mass and of a second torque of the second rotational vibrating motion of the second rotor mass is equal to zero. An undesirable coupling of one of the torques of the two rotor masses into the sensor design of the respective micromechanical component is also prevented, even when the two rotor masses are set in their respective rotational vibrating motion.

In one further advantageous specific embodiment of the micromechanical component of the present invention, the two rotor masses are designed and/or situated in such a way that the two rotor masses set in their respective rotational vibrating motion are tiltable in each case about a rotational axis situated in the first plane of symmetry and about one further rotational axis each aligned perpendicularly to the first plane of symmetry. The two rotor masses may thus be used both to detect a first rotational movement of the respective micromechanical component about a first axis situated in the first plane of symmetry and aligned in parallel to the substrate surface and to detect a second rotational movement of the respective micromechanical component about a second axis situated in the second plane of symmetry and aligned in parallel to the substrate surface.

Each of the two rotor masses may, in particular, be connected via one first spring each to a first rocker structure aligned in parallel to the first plane of symmetry and via one second spring each to a second rocker structure aligned in parallel to the first plane of symmetry. As is explained in greater detail below, undesirable movements of the two rotor masses may be systematically suppressed with the aid of the two rocker structures. The two rocker structures thus advantageously counteract an occurrence of undesirable interference modes.

In one further advantageous specific example embodiment of the micromechanical component of the present invention, the four seismic masses are designed and/or situated in such a way that with the aid of the two rotor masses set in their respective rotational vibrating motion, a first seismic mass of the first pair may be set in a first harmonic rotational movement aligned in parallel to the first plane of symmetry, a second seismic mass of the first pair may be set in a second harmonic vibrating motion aligned in parallel to the first plane of symmetry, a first seismic mass of the second pair mirror symmetrical to the first seismic mass of the first pair with respect to the second plane of symmetry may be set in the second harmonic vibrating motion, and a second seismic mass of the second pair mirror symmetrical to the second seismic mass of the first pair with respect to the second plane of symmetry may be set in the first harmonic vibrating motion, the first harmonic vibrating motion being phase-shifted by 180° relative to the second harmonic vibrating motion. A vector sum of the pulses of the harmonic vibrating motions of the four seismic masses is thus zero, so that there is no fear of any undesirable coupling of one of the pulses of the seismic masses into the sensor design of the respective micromechanical component.

The four seismic masses are preferably designed and/or situated in such a way that the four seismic masses set in their respective harmonic vibrating motion are also adjustable in parallel to the second plane of symmetry. As is explained in greater detail below, the four seismic masses in this case may be used to detect a (further) third rotational movement of the respective mechanical component about a third axis aligned perpendicularly to the substrate surface.

The advantages described above are also ensured in the case of a rotation rate sensor that includes such a micromechanical component. It is expressly noted that the rotation rate sensor may, in particular, be a 3-axis rotation rate sensor. A 3-axis rotation rate sensor in this case is understood to mean that with the aid of the respective rotation rate sensor, using the two rotor masses, a first rotational movement of the rotation rate sensor about a first axis situated in the first plane of symmetry and aligned in parallel to the substrate surface, and using the two rotor masses, a second rotational movement of the rotation rate sensor about a second axis situated in the second plane of symmetry and aligned in parallel to the substrate surface, and with the aid of the four seismic masses, a third rotational movement of the rotation rate sensor about a third axis aligned perpendicularly to the substrate surface are detectable. A detection of the respective rotational movement in this case may be understood to mean both a determination of the respective rotational movement as well as a measurement of a physical variable reflecting the respective rotational movement such as, for example, a rotation rate, a rotation velocity and/or an angular velocity.

In addition, an implementation of a corresponding manufacturing method for a micromechanical component for a rotation rate sensor also yields the advantages described above, the manufacturing method being capable of being refined according to the specific embodiments of the micromechanical component explained above.

BRIEF DESCRIPTION OF THE DRAWINGS

Further features and advantages of the present invention are explained below with reference to the figures.

DETAILED DESCRIPTION OF EXAMPLE EMBODIMENTS

Figure 1:
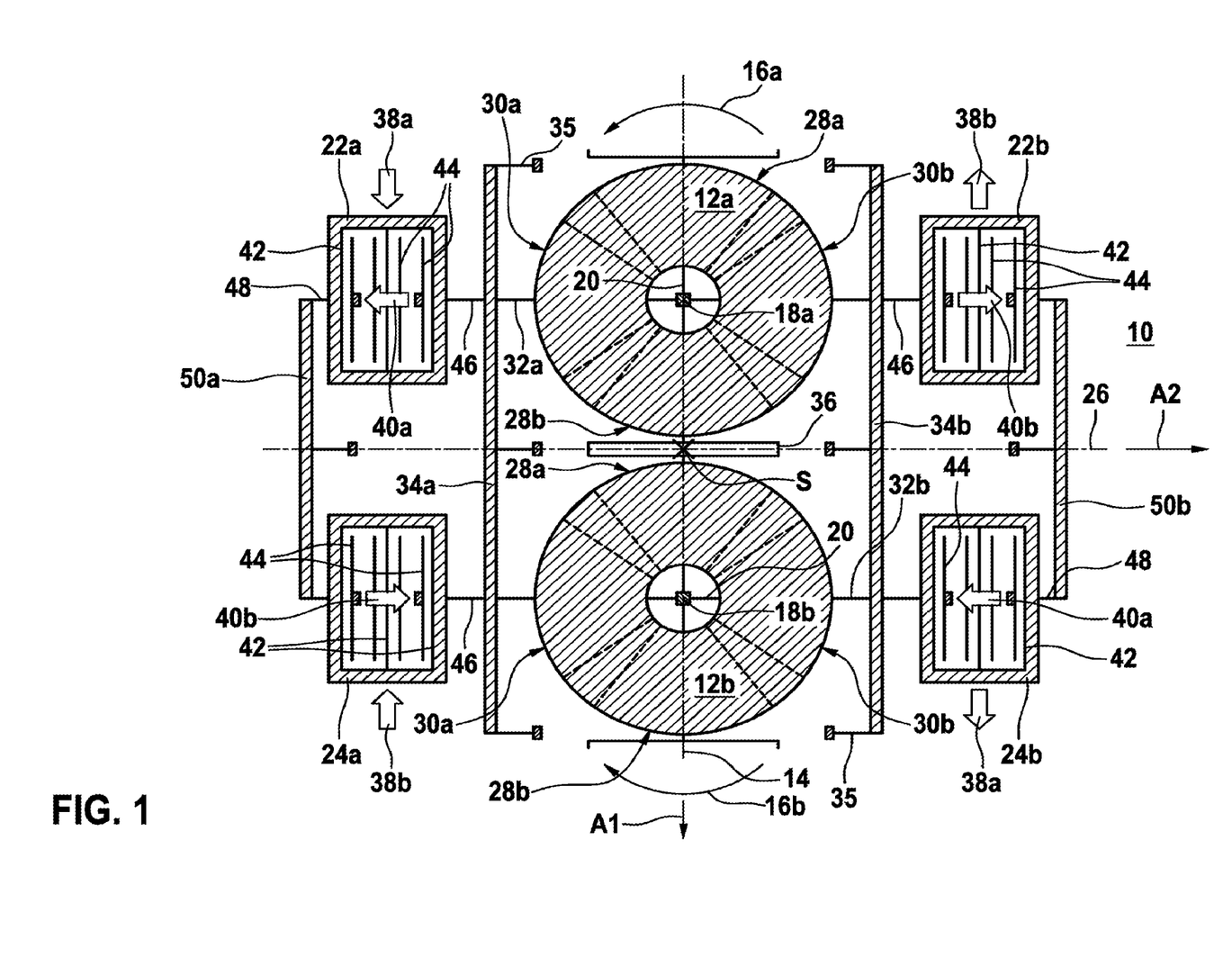
FIG. 1 schematically shows a representation of a first specific example embodiment of the micromechanical component, according to the present invention.

FIG. 1 schematically shows a representation of a first specific embodiment of the micromechanical component.

The micromechanical component schematically represented in FIG. 1 includes a substrate with a substrate surface 10. The substrate may, for example, be a semiconductor substrate, in particular, a silicon substrate.

The micromechanical component also has a one-piece first rotor mass 12a and a one-piece second rotor mass 12b. The one-piece design of first/second rotor mass 12a or 12b is understood to mean that respective first/second rotor mass 12a or 12b is implemented as a seamless and compact part per se. First rotor mass 12a and second rotor mass 12b are mirror symmetrical with respect to a first plane of symmetry 14 aligned perpendicularly to substrate surface 10 and passing through the center of first rotor mass 12a and of second rotor mass 12b. First rotor mass 12a and second rotor mass 12b are also designed/situated in such a way that first rotor mass 12a may be set in a first rotationally vibrating motion 16a about a first rotational axis 18a aligned perpendicularly to substrate surface 10 and second rotor mass 12b may be set in a second rotational vibrating motion 16b about a second rotational axis 18b aligned in parallel to first rotational axis 18a, second rotational vibrating motion 16b being phase-shifted by 180° relative to first rotational vibrating motion 16a.

Each of the two rotor masses 12a and 12b in the specific embodiment of the micromechanical component described herein includes merely by way of example an inner recess, through which rotation axis 18a or 18b of respective rotor mass 12a or 12b extends, the respective inner recess being delimited by an interior edge of respective rotor mass 12a or 12b. Each of the two rotor masses 12a and 12b is also connected, for example, at/in the micromechanical component via at least one rotor mass connection spring 20, which extends in each case from the interior edge of respective rotor mass 12a or 12b to an anchoring area fastened at substrate surface 10.

The micromechanical component also includes one first pair of seismic masses 22a and 22b and one second pair of seismic masses 24a and 24b, which are mirror symmetrical with respect to first plane of symmetry 14. The four seismic masses 22a, 22b, 24a and 24b are additionally designed/situated in such a way that the four seismic masses 22a, 22b, 24a and 24b are deflectable in each case in parallel to first plane of symmetry 14 with the aid of the two rotor masses 12a and 12b set in their respective rotational vibrating motion 16a or 16b. For this purpose, the first pair of seismic masses 22a and 22b is connected (indirectly) to first rotor mass 12a, whereas the second pair of seismic masses 24a and 24b is connected (indirectly) to second rotor mass 12b. Each of the four seismic masses 22a, 22b, 24a and 24b may, for example, be connected at/in the micromechanical component via at least one mass connection spring (not shown), which extends, in particular, from respective seismic masses 22a, 22b, 24a, or 24b to an anchoring area fastened at substrate surface 10.

In addition, first rotor mass 12a and the first pair of seismic masses 22a and 22b are mirror symmetrical to second rotor mass 12b and to the second pair of seismic masses 24a and 24b with respect to a second plane of symmetry 26 aligned perpendicularly to substrate surface 10 and perpendicularly to first plane of symmetry 14. As a result of the mirror symmetry of the two rotor masses 12a and 12b and of the four seismic masses 22a, 22b, 24a and 24b both with respect to first plane of symmetry 14 and with respect to plane of symmetry 26, external linear and rotational accelerations affect all these sensor elements 12a, 12b, 22a, 22b, 24a, and 24b "identically" in such a way that it is possible to reliably recognize as such "wrong movements" of sensor elements 12a, 12b, 22a, 22b, 24a, and 24b attributable to external linear and rotational accelerations. Sensor elements 12a, 12b, 22a, 22b, 24a, and 24b may therefore be advantageously used to detect a rotational movement of the micromechanical component, in particular, of a 3-dimensional rotational movement of the micromechanical component, without linear and rotational accelerations resulting in false signals during the detection. One further advantage of the mirror symmetry of sensor elements 12a, 12b, 22a, 22b, 24a, and 24b, both with respect to first plane of symmetry 14 and with respect to second plane of symmetry 26, is the reduction of its space requirement effectuated in this way, which facilitates a fulfillment of installation space requirements with the aid of the mechanical component.

The two rotor masses 12a and 12b and the four seismic masses 22a, 22b, 24a and 24b in the specific embodiment described herein are additionally designed/situated in such a way that a shared center of mass S of stationary first rotor mass 12a, of stationary second rotor mass 12b, of stationary first pair of seismic masses 22a and 22b and of stationary second pair of seismic masses 24a and 24b is situated in a line of intersection of first plane of symmetry 14 with second plane of symmetry 26. This also helps to improve the robustness of the micromechanical component described herein against external linear and rotational accelerations.

Moreover, it is ensured based on the arrangement/design of the two rotor masses 12a and 12b of the micromechanical component described herein that even when the two rotor masses 12a and 12b are set in their respective rotational vibrating motions 16a and 16b, a vector sum of a first torque of first rotational vibrating motion 16a of first rotor mass 12a and of a second torque of second rotational vibrating motion 16b of second rotor mass 12b is (essentially always) equal to zero. Thus, an undesirable coupling of one of the torques of one the two rotor masses 12a and 12b need not be feared, even when the two rotor masses 12a and 12b are set in their respective rotational vibrating motions 16a and 16b.

Each of the two rotor masses 12a and 12b is also designed/situated in such a way that the two rotor masses 12a and 12b when set in their respective rotational vibrating motion 16a or 16b are each tiltable about a first rotational axis (not delineated) situated in first plane of symmetry 14 (and preferably aligned in parallel to substrate surface 10), and about one second rotational axis each (not delineated) aligned perpendicularly to first plane of symmetry 14 (and preferably in parallel to substrate surface 10). During a first rotational movement of the micromechanical component about a first axis A1 situated in first plane of symmetry 14 and aligned in parallel to substrate surface 10, the Coriolis force thus causes initial tilting movements of the two rotor masses 12a and 12b set in their respective rotational vibrating motions 16a or 16b about their respective first rotational axis, the first tilting movements of the two rotor masses 12a and 12b being mirror symmetrical with respect to second plane of symmetry 26 due to the phase angle of 180° between first rotational vibrating motion 16a and second rotational vibrating motion 16b. Such mirror symmetrical movements of the two rotary masses 12a and 12b with respect to second plane of symmetry 26 are not triggered by external linear and rotational accelerations.

Each of the two rotor masses 12a and 12b may be assigned one first pair of sensor electrodes 28a and 28b each, which extends in each case along first plane of symmetry 14 adjacent to assigned rotor mass 12a or 12b, each of sensor electrodes 28a and 28b with assigned rotor mass 12a or 12b forming a capacitor. Sensor electrodes 28a and 28b may, for example, be attached at substrate surface 10. In a differential evaluation of the signals ascertained with the aid of sensor electrodes 28a and 28b, the mirror symmetry of the first tilting movements of the two rotor masses 12a and 12b with respect to second plane of symmetry 26 results in an amplification of the signals triggered by the first rotational movement of the micromechanical component about first axis A1, while false signals of sensor electrodes 28a and 28b attributable to external linear and rotational accelerations of the micromechanical component are automatically corrected for/"filtered out" with the aid of the differential evaluation. The first rotational movement of the micromechanical component about first axis A1 is therefore reliably detectable with the aid of the two rotor masses 12a and 12b.

Correspondingly, the Coriolis force causes second tilting movements of rotor masses 12a and 12b set in their respective rotational vibrating motion 16a or 16b during a second rotational movement of the micromechanical component about a second axis A2 situated within second plane of symmetry 26 and aligned in parallel to substrate surface 10, the second tilting movements of the two rotor masses 12a and 12b being point-symmetrical with respect to center of mass S due to the phase angle of 180° between first rotational vibrating motion 16a and second rotational vibrating motion 16b. Such point-symmetrical movements of the two rotor masses 12a and 12b with respect to center of mass S are not triggered by external linear and rotational accelerations.

Each of the two rotor masses 12a and 12b may therefore each be assigned one second pair of sensor electrodes 30a and 30b each, which extends in each case along a line aligned in parallel to second plane of symmetry 26 adjacent to assigned rotor mass 12a or 12b, each of sensor electrodes 30a and 30b with assigned rotor mass 12a or 12b forming a capacitor. Sensor electrodes 30a and 30b may also be attached, in particular, at substrate surface 10. In a differential evaluation of the signals ascertained with the aid of sensor electrodes 30a and 30b, the point symmetry of the second tilting movements of the two rotor masses 12a and 12b with respect to center of mass S results in an amplification of the signals attributable to the second rotational movement of the micromechanical component about second axis A2, while false signals of sensor electrodes 30a and 30b based on external linear and rotational accelerations of the micromechanical component are automatically corrected for/"filtered out" with the aid of the differential evaluation. The second rotational movement of the micromechanical component about second axis A2 is therefore also reliably detectable with the aid of rotor masses 12a and 12b.

The two rotor masses 12a and 12b may thus be referred to as a double rotor, which may be advantageously used for carrying out vibrationally robust measurements for first axis A1 and second axis A2.

As an advantageous refinement, the two rotor masses 12a and 12b are also coupled to one another via an (optional) intermediate spring 36, which does not counteract the first tilting movements of the two rotor masses 12a and 12b triggered by the first rotational movement of the micromechanical component about first axis A1 and mirror symmetrical with respect to second plane of symmetry 26, but does suppress movements of the two rotor masses 12a and 12b asymmetrical with respect to second plane of symmetry 26 about their first rotational axis, which are conventionally triggered by external linear and rotational accelerations of the micromechanical component. In the example of FIG. 1, intermediate spring 36 is an O-spring. An O-spring is understood to be a type of spring that includes a web-shaped first end section (connected at first rotor mass 12a), a web-shaped second end section (connected at second rotor mass 12b) and an intermediate section situated between the two end sections, four web-shaped spring sections in an O-shape or rectangular shape forming the intermediate section. Such a design of intermediate spring 36 is, however, to be interpreted only as exemplary.

As an additional (optional) refinement, each of the two rotor masses 12a and 12b is also connected via one spring 32a each to a first rocker structure 34a aligned in parallel to first plane of symmetry 14 and via one second spring 32b each to a second rocker structure 34a aligned in parallel to first plane of symmetry 14. Each of rocker structures 34a and 34b is tiltable about a tilting axis situated in second plane of symmetry 26 (and aligned preferably in parallel to substrate surface 10). Each of rocker structures 34a and 34b may, for example, be connected at/in the micromechanical component via at least one rocker structure connection spring 35, which may extend in each case from respective rocker structure 34a or 34b to an anchoring area attached at substrate surface 10. Rocker structures 34a and 34b do not counteract the tilting movements of the two rotor masses 12a and 12b point-symmetrical with respect to center of mass S, whereas movements of the two rotor masses 12a and 12b mirror symmetrical with respect to second plane of symmetry 26 about their respective second rotational axis are suppressed by the two rocker structures 34a and 34b.

The four seismic masses 22a, 22b, 24a and 24b are connected to assigned rotor mass 12a or 12b in such a way that a first seismic mass 22a of the first pair may be set/is set in a first harmonic vibrating motion 38a aligned in parallel to first plane of symmetry 14 with the aid of the two rotor masses 12a and 12b set in their respective rotational vibrating motion 16a and 16b, a second seismic mass 22b of the first pair may be set/is set in a second harmonic vibrating motion 38b aligned in parallel to first plane of symmetry 14, a first seismic mass 24a of the second pair mirror symmetrical to first seismic mass 22a of the first pair with respect to second plane of symmetry 26 may be set/is set in second harmonic vibrating motion 38b, and a second seismic mass 24b of the second pair mirror symmetrical to second seismic mass 22b of the first pair with respect to second plane of symmetry 26 may be set/is set in first harmonic vibrating motion 38a. A significant advantage of the excitation of the harmonic vibrating motions 38a and 38b of the four seismic masses 22a, 22b, 24a, and 24b with the aid of the two rotor masses 12a and 12b described herein is that first harmonic vibrating motion 38a is phase-shifted by 180° relative to second harmonic vibrating motion 38b. In addition, the four seismic masses 22a, 22b, 24a, and 24b set in their respective harmonic vibrating motion 38a or 38b are deflectable/adjustable in parallel to second plane of symmetry 26.

In a third rotational movement of the micromechanical component about a third axis (not delineated) aligned perpendicularly to substrate surface 10, the Coriolis force thus deflects the four seismic masses 22a, 22b, 24a, and 24b set in their respective harmonic vibrating motion 38a or 38b in parallel to second plane of symmetry 26, the phase angle of 180° between first harmonic vibrating motion 38a and second harmonic vibrating movement 38b causing a first adjustment movement 40a of first seismic mass 22a of the first pair and of second seismic mass 24b of the second pair and a second adjustment movement 40b of second seismic mass 22b of the first pair and of first seismic mass 24a of the second pair directed opposite first adjustment movement 40a. Adjustment movements 40a and 40b of the four seismic masses 22a, 22b, 24a, and 24b triggered by the Coriolis force are therefore mirror symmetrical with respect to first plane of symmetry 14. External linear and rotational accelerations of the micromechanical component do not trigger such adjustment movements 40a and 40b of the four seismic masses 22a, 22b, 24a, and 24b mirror symmetrical with respect to first plane of symmetry 14. For this reason, the third rotational movement of the micromechanical component about the third axis is also reliably detectable with the aid of the four seismic masses 22a, 22b, 24a, and 24b.

Thus, seismic masses 22a, 22b, 24a, and 24b are preferably designed with (co-adjustable) electrode elements 42, each of which forms a capacitor including one stationary electrode 44 each, which is attached, for example, at substrate surface 10. In a differential evaluation of the signals ascertained with the aid of electrode elements 42, the mirror symmetry of adjustment movements 40a and 40b of the four seismic masses 22a, 22b, 24a, and 24b with respect to first plane of symmetry 14 results in an amplification of the signals attributable to the third rotational movement of the micromechanical component around the third axis, whereas false signals of electrode elements 42 and of stationary electrodes 44 based on external linear and rotational accelerations of the micromechanical component are automatically corrected for/"filtered out" with the aid of the differential evaluation.

In the specific embodiment of FIG. 1, the four seismic masses 22a, 22b, 24a, and 24b are frame structures merely by way of example. Each of the four seismic masses 22a, 22b, 24a, and 24b may, for example, be connected via one spring element 46 each at the adjacent first or second rocker structure 34a or 34b. Optionally, the two first seismic masses 22a and 24a may be connected via one spring element 48 each at a first coupler rocker 50a and the second seismic masses 22b and 24b may be connected via one spring element 48 each at a second coupler rocker 50b. In this case, each of the two coupler rockers 50a and 50b is preferably tiltable about a rocker axis passing through the center of respective coupler rocker 50a or 50b and aligned perpendicularly to substrate surface 10. Coupler rockers 50a or 50b in this case do not counteract adjustment movements 40a and 40b of the four seismic masses 22a, 22b, 24a, and 24b mirror symmetrical with respect to first plane of symmetry 14, whereas movements of first plane of symmetry 14 asymmetrical with respect to first plane of symmetry 14 are suppressed by the two coupler rockers 50a or 50b.

One further advantage of the micromechanical component of FIG. 1 is that even if the two rotor masses 12a and 12b are set into their respective rotational vibrating motion 16a or 16b in such a way that the four seismic masses 22a, 22b, 24a, and 24b are deflectable/are deflected in each case in parallel to first plane of symmetry 14, in particular, in their respective harmonic vibrating motion 38a or 38b, the shared center of mass S, however, is situated in the line of intersection of first plane of symmetry 14 with second plane of symmetry 26. Thus, even during a movement of sensor elements 12a, 12b, 22a, 22b, 24a, and 24b, no undesirable impulse coupling into the micromechanical component need be feared.

Figure 2:
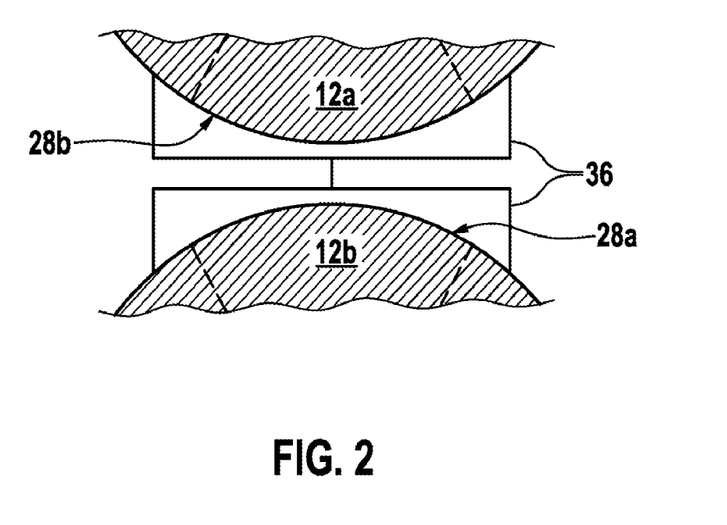
FIG. 2 schematically shows a partial representation of a second specific example embodiment of the micromechanical component, according to the present invention.

FIG. 2 schematically shows a partial representation of a second specific embodiment of the micromechanical component.

The micromechanical component of FIG. 2 differs from the above-explained specific embodiment merely in the form of its intermediate spring 36. For example, intermediate spring 36 of FIG. 2 has a first end section including a fork connected at first rotor mass 12a, a second end section including a fork connected at second rotor mass 12b, and a web-shaped intermediate section situated between the two end sections.

With respect to further features of the micromechanical component of FIG. 2 and their advantages, reference is made to the specific embodiment of FIG. 1.

Figure 3:
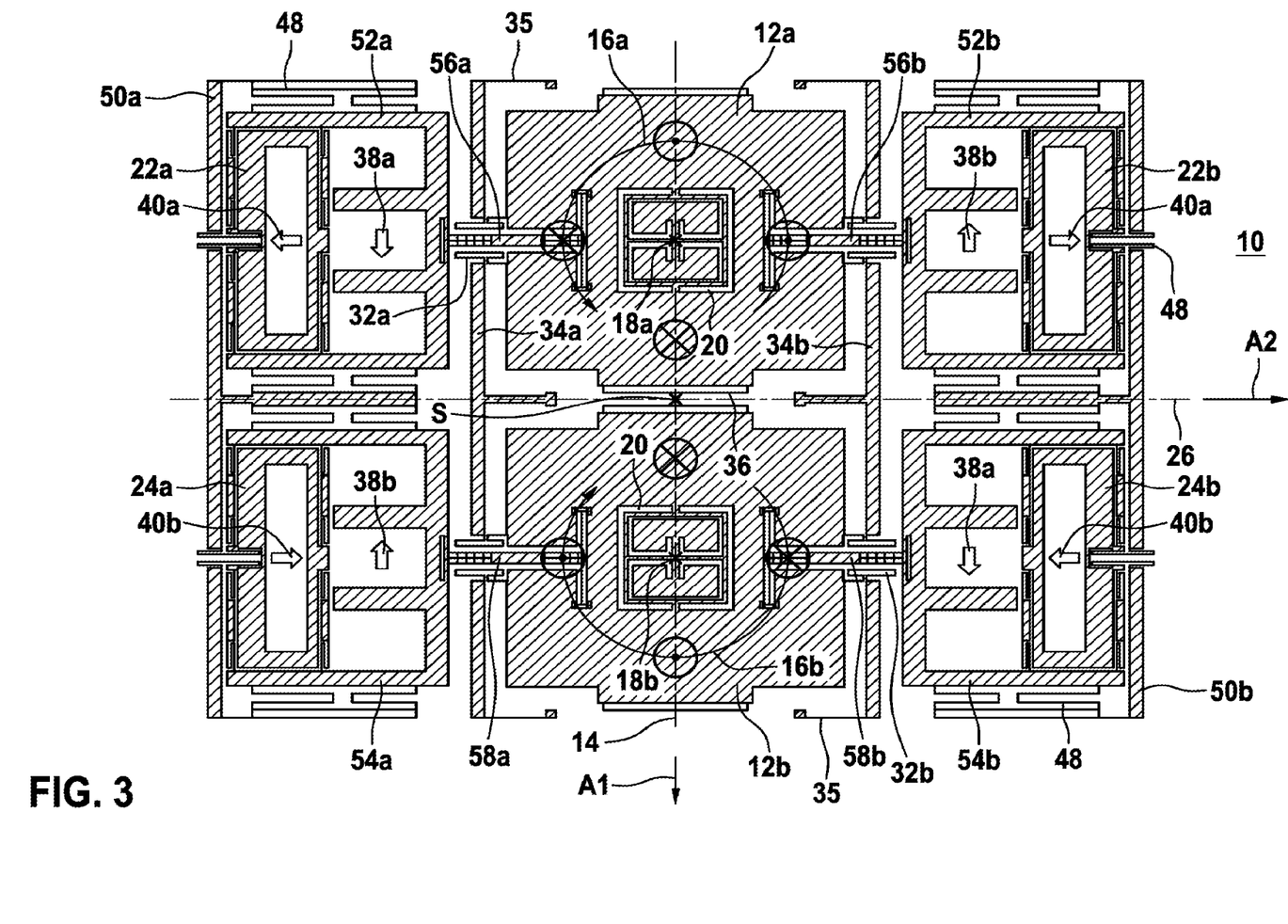
FIG. 3 schematically shows a representation of a third specific example embodiment of the micromechanical component, according to the present invention.

FIG. 3 schematically shows a representation of a third specific embodiment of the micromechanical component.

The micromechanical component schematically represented in FIG. 3 includes as a further refinement to the above-described specific embodiment also a first pair of drive structures 52a and 52b and a second pair of drive structures 54a and 54b. A first drive structure 52a of the first pair is connected via at least one first spring element 56a to first rotor mass 12a, while a second drive structure 52b of the first pair is connected via at least one second spring element 56b to first rotor mass 12a. Correspondingly, a first drive structure 54a mirror symmetrical to first drive structure 52a of the first pair with respect to second plane of symmetry 26 is connected via at least one first spring element 58a to second rotor mass 12b, while a second drive structure 54b of the second pair mirror symmetrical to the second drive structure 52b of the first pair with respect to the second plane of symmetry 26 is connected via at least one second spring element 58b to second rotor mass 12b.

The four drive structures 52a, 52b, 54a and 54b are each designed/situated in such a way that first drive structure 52a of the first pair may be set in a first harmonic vibrating motion 38a aligned in parallel to first plane of symmetry 14, second drive structure 52b of the first pair may be set in second harmonic vibrating motion 38b aligned in parallel to first plane of symmetry 14 and phase-shifted by 180° with respect to first harmonic vibrating motion 38a, first drive structure 54a of the second pair may be set in second harmonic vibrating motion 38b and second drive structure 54b of the second pair may be set in first harmonic vibrating motion 38a. Preferably, the four drive structures 52a, 52b, 54a and 54b are each designed with electrode elements (not delineated), each of which forms with one stationary electrode (not shown) each attached, for example, at substrate surface 10, a capacitor. Each of the four drive structures 52a, 52b, 54a, and 54b may, for example, be one drive frame each.

Harmonic vibrating motions 38a and 38b of the four drive structures 52a, 52b, 54a and, 54b cause the respective rotational vibrating motion 16 [sic; 16a] or 16b of the two rotor masses 12a and 12b and the respective harmonic vibrating motion 38a or 38b of connected seismic mass 22a, 22b, 24a, and 24b. Merely by way of example, first seismic mass 22a of the first pair in the specific embodiment of FIG. 3 is (directly) connected at a side of first drive structure 52a of the first pair directed away from first rotor mass 12a, second seismic mass 22b of the first pair is connected (directly) at a side of second drive structure 52b of the first pair directed away from first rotor mass 12a, first seismic mass 24a of the second pair is connected (directly) at a side of first drive structure 54a of the second pair directed away from second rotor mass 12b, and second seismic mass 24b of the second pair is connected (directly) at a side of second drive structure 54b of the second pair directed away from second rotor mass 12b. This may be described as an "external connection" of drive structures 52a, 52b, 54a, and 54b to the two rotor masses 12a and 12b and as an "external connection" of each seismic mass 22a, 22b, 24a, and 24b to one each of drive structures 52a, 52b, 54a, and 54b. (For greater clarity, electrodes 28a, 28b, 30a, 30b, 42 and 44 are not depicted in FIG. 3).

With respect to further features of the micromechanical component of FIG. 3 and their advantages, reference is made to the above-described specific embodiments.

Figure 4:
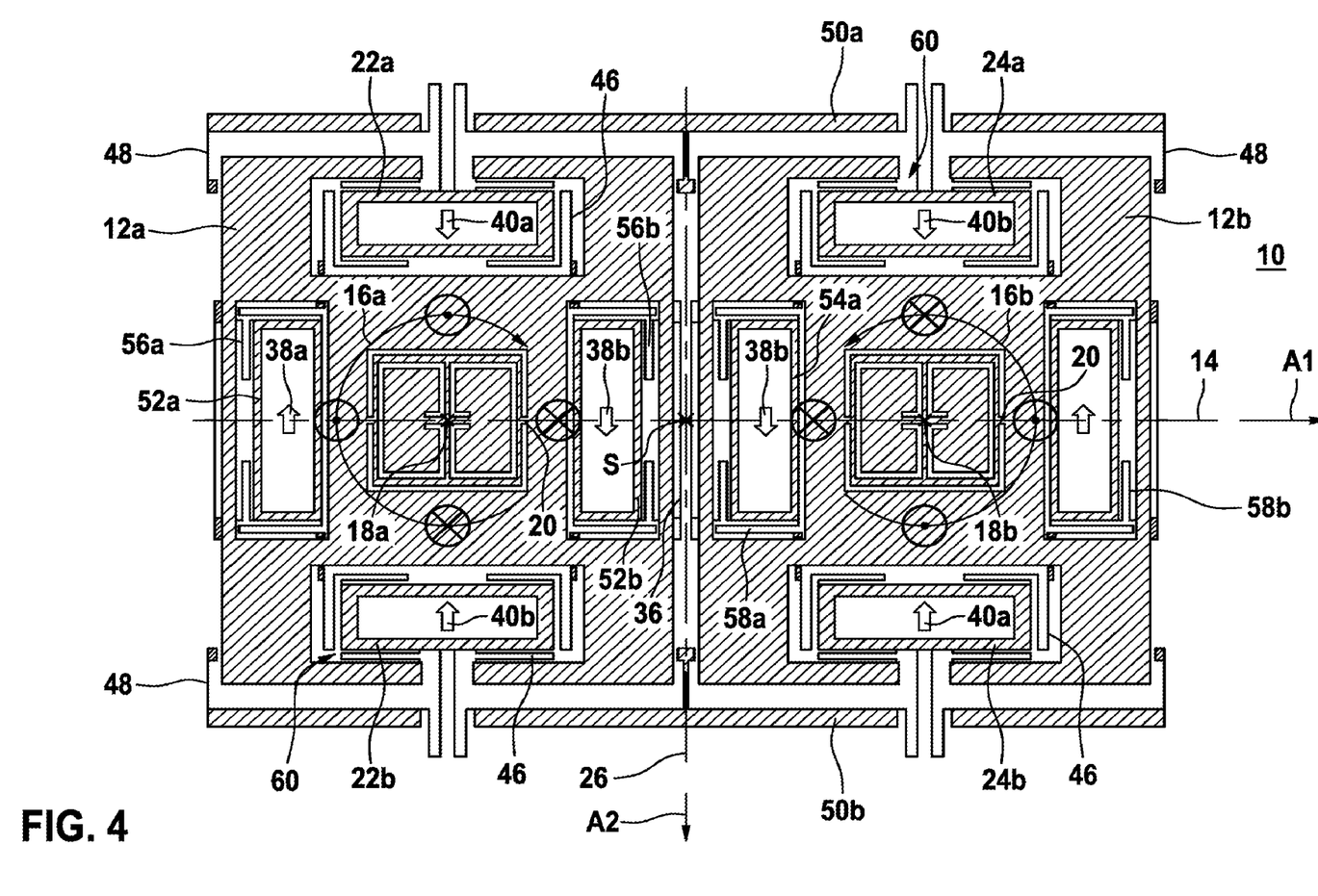
FIG. 4 schematically shows a representation of a fourth specific example embodiment of the micromechanical component, according to the present invention.

FIG. 4 schematically shows a representation of a fourth specific embodiment of the micromechanical component.

In the micromechanical component of FIG. 4, four recesses 60 each are formed in each of the two rotor masses 12a and 12b, either a drive structure 52a, 52b, 54a, or 54b assigned to respective rotor mass 12a or 12b or a seismic mass 22a, 22b, 24a, and 24b assigned to respective rotor mass 12a or 12b being situated in each of openings 60. Seismic masses 22a, 22b, 24a, and 24b and drive structures 52a, 52b, 54a, and 54b are thus integrated separately from one another into openings 60 of rotor masses 12a and 12b. Seismic masses 22a, 22b, 24a, and 24b and drive structures 52a, 52b, 54a, and 54b are each coupled via springs 46, 56a, 58a, and 58b to assigned rotor mass 12a or 12b. In addition, a formation of rocker structures 34a and 34b is omitted in the micromechanical component of FIG. 4, since coupler rockers 50a and 50b in this specific embodiment also influence the tilting of rotor masses 12a and 12b. (For greater clarity, electrodes 28a, 28b, 30a, 30b, 42 and 44 are not depicted in FIG. 4).

With respect to further features of the micromechanical component of FIG. 4 and their advantages, reference is made to the above-described specific embodiments.

Figure 5:
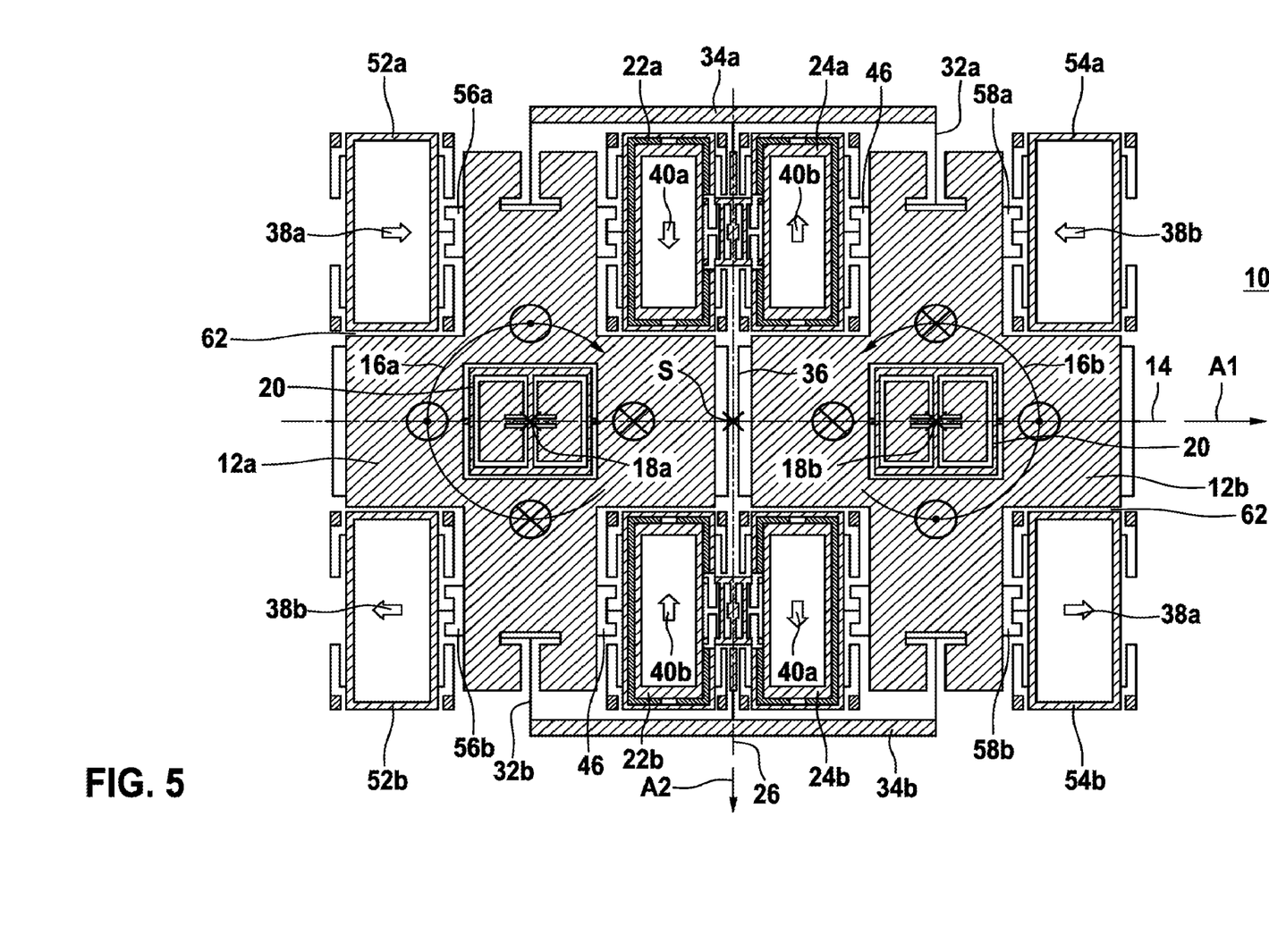
FIG. 5 schematically shows a representation of a fifth specific example embodiment of the micromechanical component, according to the present invention.

FIG. 5 schematically shows a representation of a fifth specific embodiment of the micromechanical component.

In the micromechanical component schematically represented in FIG. 5, the two rotor masses 12a and 12b each have a cross-shaped or plus-shaped design. This may be understood to mean that each of the two rotor masses 12a and 12b have four arms each projecting outwardly from their center. Either a drive structure 52a, 52b, 54a, or 54b assigned to respective rotor mass 12a or 12b, or a seismic mass 22a, 22b, 24a, or 24b assigned to respective rotor mass 12a or 12b is inserted into intermediate spaces 62 between two adjacent arms of respective rotor mass 12a or 12b. Seismic masses 22a, 22b, 24a, and 24b and drive structures 52a, 52b, 54a, 54b are each coupled via springs 46, 56a, 56b, 58a and 58b to assigned rotor masses 12a or 12b. (For greater clarity, electrodes 28a, 28b, 30a, 30b, 42 and 44 are also not visually depicted in FIG. 5.)

With respect to further features of the micromechanical component of FIG. 5 and their advantages, reference is made to the above-described specific embodiments of FIGS. 1 through 3.

In all of the above-described micromechanical components, rotor masses 12a and 12b, seismic masses 22a, 22b, 24a, and 24b and drive structures 52a, 52b, 54a, and 54b, rocker structures 34a and 34b, coupler rockers 50a and 50b and all springs 20, 32a, 32b, 35, 36, 46, and 48 may be structured from a semiconductor layer deposited over substrate surface 10 such as, in particular, a silicon layer. The design of respective intermediate spring 36 may optionally be the type of spring depicted in FIG. 1 or the type of spring depicted in FIG. 2.

All of the above-described micromechanical components are suitable for use as (at least part of a) rotation rate sensor such as, in particular, a 3-axis rotation rate sensor, with the aid of which both the first rotational movement about first axis A1, the second rotational movement about second axis A2, as well as the third rotational movement about the third axis aligned perpendicularly to substrate surface 10; are detectable. A detection of the respective rotational movement may be understood to mean a determination of the respective rotational movement as well as a measurement of a physical variable reflecting the respective rotational movement such as, for example, a rotation rate, a rotation velocity and/or an angular velocity. For each of the three axes, the detection is implementable with a high degree of robustness against linear or rotational accelerations, since false signals attributable to external linear or rotational accelerations may be automatically corrected for/"filtered out" with the aid of the differential evaluation of the signals. The above-described micromechanical components may be used for both a closed loop control as well as for an open loop operation.

Figure 6:
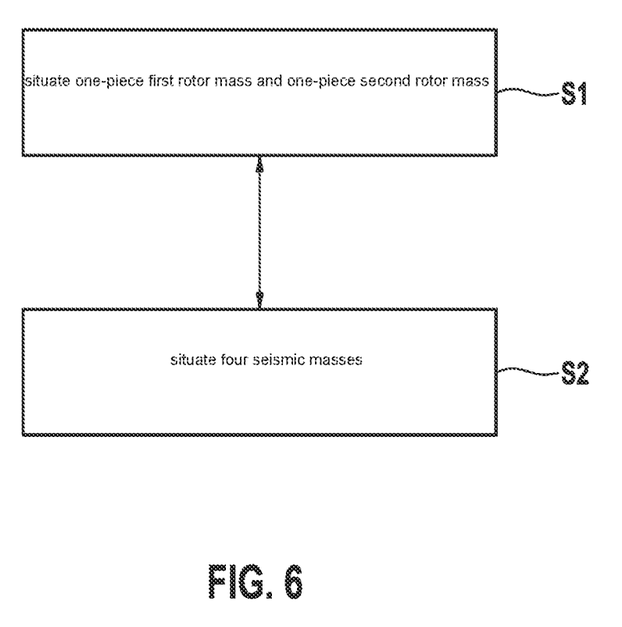
FIG. 6 shows a flowchart for explaining one specific example embodiment of the manufacturing method for a micromechanical component for a rotation rate sensor, according to the present invention.

FIG. 6 shows a flowchart for explaining one specific embodiment of the manufacturing method for a micromechanical component for a rotation rate sensor.

In a method step S1, a one-piece first rotor mass and a one-piece second rotor mass of the micromechanical component are designed/situated mirror symmetrically with respect to a first plane of symmetry aligned perpendicularly to a substrate surface of a substrate of the micromechanical component and passing through the center of the first rotor mass and of the second rotor mass in such a way that the first rotor mass may be set in a first rotational vibrating motion about a first rotational axis aligned perpendicularly to the substrate surface, and the second rotor mass may be set in a second rotational vibrating motion phase-shifted by 180° to the first rotational vibrating motion about a second rotational axis aligned in parallel to the first rotational axis.

As method step S2, four seismic masses of the micromechanical component are designed/situated mirror symmetrically with respect to the first plane of symmetry in such a way that the four seismic masses are each deflectable in parallel to the first plane of symmetry with the aid of the two rotor masses set in their respective rotational vibrating motion. Method steps S1 and S2 may be carried out in an arbitrary chronological sequence, simultaneously or temporally overlapping. Method steps S1 and S2 are also carried out in such a way that the first rotor mass and a first pair of the four seismic masses connected to the first rotor mass are designed/situated mirror symmetrically to the second rotor mass and a second pair of the four seismic masses connected to the second rotor mass with respect to a second plane of symmetry aligned perpendicularly to the substrate surface and perpendicularly to the first plane of symmetry. Thus, an implementation of the manufacturing method described herein also yields the aforementioned advantages.

What is claimed is:

1. A micromechanical component for a rotation rate sensor, comprising:
   a substrate including a substrate surface;
   a one-piece first rotor mass and a one-piece second rotor mass, which are situated mirror symmetrically with respect to a first plane of symmetry aligned perpendicularly to the substrate surface and passing through a center of the first rotor mass and of the second rotor mass in such a way that the first rotor mass may be set in a first rotational vibrating motion about a first rotational axis aligned perpendicularly to the substrate surface, and the second rotor mass may be set in a second rotational vibrating motion phase-shifted by 180° to the first rotational vibrating motion about a second rotational axis aligned in parallel to the first rotational axis; and
   four seismic masses, which are situated mirror symmetrically with respect to the first plane of symmetry in such a way that the four seismic masses are each deflectable in parallel to the first plane of symmetry using the first and second rotor masses set in their first and second rotational vibrating motions, respective;
   wherein the first rotor mass and a first pair of the four seismic masses connected to the first rotor mass are situated mirror symmetrically to the second rotor mass and a second pair of the four seismic masses connected to the second rotor mass, with respect to a second plane of symmetry aligned perpendicularly to the substrate surface and perpendicularly to the first plane of symmetry.

2. The micromechanical component as recited in claim 1, wherein the first and second rotor masses and the four seismic masses are situated in such a way that a shared center of mass of the first rotor mass, of the second rotor mass, of the first pair of seismic masses, and of the stationary second pair of seismic masses, when stationary, is situated in a line of intersection of the first plane of symmetry with the second plane of symmetry.

3. The micromechanical component as recited in claim 2, wherein the first and second rotor masses and the four seismic masses are situated in such a way that, even when the first and second rotor masses are set in their first and second rotational vibrating motions, respectively, the four seismic masses are each deflectable in parallel to the first plane of symmetry, the shared center of mass of the first rotor mass, of the second rotor mass, of the first pair of seismic masses, and of the second pair of seismic masses, is situated in a line of intersection of the first plane of symmetry with the second plane of symmetry.

4. The micromechanical component as recited in claim 1, wherein the first and second rotor masses are situated in such a way that when the first and second rotor masses are set in their first and second rotational vibrating motions, respectively, a vector sum of a first torque of the first rotational vibrating motion of the first rotor mass and of a second torque of the second rotational vibrating motion of the second rotor mass, is equal to zero.

5. The micromechanical component as recited in claim 1, wherein the first and second rotor masses are situated in such a way that the first and second rotor masses, set in the first and second rotational vibrating motions, respectively, are each tiltable about a rotational axis situated in the first plane of symmetry and about one further rotational axis each aligned perpendicularly to the first plane of symmetry.

6. The micromechanical component as recited in claim 1, wherein each of the first and second rotor masses is connected via one first spring each to a first rocker structure aligned in parallel to the first plane of symmetry and via one second spring each to a second rocker structure aligned in parallel to the first plane of symmetry.

7. The micromechanical component as recited in claim 1, wherein the four seismic masses are situated in such a way that using the first and second rotor masses set in their first and second vibrating motion, respectively, a first seismic mass of the first pair may be set in a first harmonic vibrating motion aligned in parallel to the first plane of symmetry, a second seismic mass of the first pair may be set in a second harmonic vibrating motion aligned in parallel to the first plane of symmetry, a first seismic mass of the second pair mirror symmetrical to first seismic mass with respect to the second plane of symmetry may be set in the second harmonic vibrating motion and a second seismic mass of the second pair mirror symmetrical to the second seismic mass of the first pair with respect to the second plane of symmetry may be set in the first harmonic vibrating motion, the first harmonic vibrating motion being phase-shifted by 180° relative to the second harmonic vibrating motion.

8. The micromechanical component as recited in claim 7, wherein the four seismic masses are situated in such a way that the four seismic masses set in their respective harmonic vibrating motion are also adjustable parallel to the second plane of symmetry.

9. A rotation rate sensor, comprising:
a micromechanical component including:
a substrate including a substrate surface,
a one-piece first rotor mass and a one-piece second rotor mass, which are situated mirror symmetrically with respect to a first plane of symmetry aligned perpendicularly to the substrate surface and passing through a center of the first rotor mass and of the second rotor mass in such a way that the first rotor mass may be set in a first rotational vibrating motion about a first rotational axis aligned perpendicularly to the substrate surface, and the second rotor mass may be set in a second rotational vibrating motion phase-shifted by 180° to the first rotational vibrating motion about a second rotational axis aligned in parallel to the first rotational axis, and
four seismic masses, which are situated mirror symmetrically with respect to the first plane of symmetry in such a way that the four seismic masses are each deflectable in parallel to the first plane of symmetry using the first and second rotor masses set in their first and second rotational vibrating motions, respective,
wherein the first rotor mass and a first pair of the four seismic masses connected to the first rotor mass are situated mirror symmetrically to the second rotor mass and a second pair of the four seismic masses connected to the second rotor mass, with respect to a second plane of symmetry aligned perpendicularly to the substrate surface and perpendicularly to the first plane of symmetry.

10. A manufacturing method for a micromechanical component for a data rate sensor comprising the following steps:
situating a one-piece first rotor mass and a one-piece second rotor mass of the micromechanical component mirror symmetrically with respect to a first plane of symmetry aligned perpendicularly to a substrate surface of a substrate of the micromechanical component and passing through a center of the first rotor mass and of the second rotor mass in such a way that the first rotor mass may be set in a first rotational vibrating motion about a first rotational axis aligned perpendicularly to the substrate surface and the second rotor mass may be set in a second rotational vibrating motion phase-shifted by 180° relative to the first rotational vibrating motion about a second rotational axis aligned in parallel to the first rotational axis; and
situating four seismic masses of the micromechanical component mirror symmetrically with respect to the first plane of symmetry in such a way that the four seismic masses are deflectable in each case in parallel to the first plane of symmetry using the first and second rotor masses set in their first and second rotational vibrating motions, respectively;
wherein the first rotor mass and a first pair of the four seismic masses connected to the first rotor mass are situated mirror symmetrically to the second rotor mass and to a second pair of the four seismic masses with respect to the second plane of symmetry aligned perpendicularly to the substrate surface and perpendicularly to the first plane of symmetry.

* * * * *